United States Patent [19]

Souma et al.

[11] Patent Number: 5,901,244
[45] Date of Patent: May 4, 1999

[54] FEATURE EXTRACTION SYSTEM AND FACE IMAGE RECOGNITION SYSTEM

[75] Inventors: Masaki Souma; Kenji Nagao, both of Yokohama, Japan

[73] Assignee: Matsushita Electric Industrial Co., Ltd., Osaka, Japan

[21] Appl. No.: 08/764,546

[22] Filed: Dec. 12, 1996

[30] Foreign Application Priority Data

Jun. 18, 1996 [JP] Japan .................................. 8-177255
Jun. 18, 1996 [JP] Japan .................................. 8-177256

[51] Int. Cl.[6] .............................. G06K 9/46; G06K 9/66
[52] U.S. Cl. ......................... 382/190; 382/118; 382/225
[58] Field of Search ................................ 382/118, 160, 382/190, 201, 224, 225, 228, 276

[56] References Cited

U.S. PATENT DOCUMENTS 5,164,992  11/1992  Turk et al. ............................. 382/118
5,675,663  10/1997  Koerner et al. ........................ 382/118
5,710,833   1/1998  Moghaddam et al. ................... 382/118

OTHER PUBLICATIONS

Matthew A. Turk, et al: "Face Recognition Using Eigenfaces", *IEEE*, 1991, pp. 586–591.

M. Kirby, et al: "Application of the Karhunen–Loevre Procedure for the Characterization of Human Faces", *IEEE Transactions on Pattern Analysis and Machine Intelligence*, vol. 12, No. 1; Jan. 1990; pp. 103–108.

K. Fukunaga: "Feature Extraction and Linear Mapping for Signal Representation", *Statistical Pattern Recognition*; 1990; pp. 399–413.

*Primary Examiner*—Phuoc Tran
*Attorney, Agent, or Firm*—Lowe Hauptman Gopstein Gilman & Berner

[57] ABSTRACT

A feature extraction system for statistically analyzing a set of samples of feature vectors to calculate a feature being an index for a pattern identification, which is capable of identifying confusing data with a high robustness. In this system, a storage section stores a feature vector inputted through an input section and a neighborhood vector selection section selects a specific feature vector from the feature vectors existing in the storage section. The specific feature is a neighborhood vector close in distance to the feature vector stored in the storage section. Further, the system is equipped with a feature vector space production section for outputting a partial vector space. The partial vector space is made to maximize the local scattering property of the feature vector when the feature vector is orthogonally projected to that space.

11 Claims, 4 Drawing Sheets

FEATURE EXTRACTION SYSTEM AND FACE IMAGE RECOGNITION SYSTEM

BACKGROUND OF THE INVENTION

1. Field of the Invention

The present invention relates to feature extraction, and more particularly to a feature extraction system which statistically analyzes a set of samples of feature vectors to calculate a feature or characteristic serving as an index at a pattern identification, with this system allowing more accurate identification as compared with a prior system. In addition, this invention relates to a face image recognition system useful for identification systems using human faces, the certification of licenses and passports, the user identification for man-machine interface and security, and the information compression for low bit rate picture communications, and more particularly to a face image recognition system which narrows the candidates for a plausible model matching with an input image down through a first-stage model selection (first model selection means) and subsequently conducts a final recognition among the selected candidates through the use of a feature extraction different from the first stage in a second-stage selection.

2. Description of the Prior Art

The pattern identification or recognition is applicable to various fields such as a face identification or recognition available for security systems. For the pattern identification, a method based upon the KL (Karhunen-Loeve) expansion has well been known as a way of extracting a feature from a set of samples of feature vectors. This method has the ability to attain, as a feature serving as an index for the pattern recognition, an orthonormal base (eigenvector or proper vector) determined on the basis of the dispersion or variance of a set of samples of feature vectors and a value (eigenvalue) representative of the dispersion of the feature vectors in each basic direction. A description will be taken hereinbelow of the basic property of the KL expansion.

The KL expansion signifies an optimal orthogonal development under the minimum mean squared error standard. More specifically, when a subspace U(M) is produced by selecting M ($\leq$N) in the order of decreasing eigenvalue out of the orthonormal bases obtainable on the basis of a set of samples of N-dimensional feature vectors through the KL expansion, the subspace U(M) assumes an M-dimensional partial vector space which minimizes the mean square error from the feature vectors. In addition, the subspace U(M) is also characterised as an M-dimensional subspace which maximizes the expectation of the square distance between the feature vectors projected. These contents have been described in detail by "Statistical Pattern Recognition (Second Edition) Academic Press 1990" Chapter 9, written by Keinosuke Fukunaga.

Furthermore, for the identification being actually made using the feature obtained from the result of the KL expansion, the feature vector closest to the input feature vector is selected from the standard data through the use of the following distance. That is, the feature vector is orthogonally projected on the aforesaid subspace U(M) to measure the distance on the subspace U(M). As the distance to be used at that time there is the Euclidean distance defined in according to the following equation or formula (1):

$$d(x, y) = \sqrt{\sum_i (x_i - y_i)^2} \text{ where } x = (x_i), y = (y_i) \quad (1)$$

or the distance expressed by the following equation (2):

$$\text{math}(x, y) = \sqrt{\sum_i \frac{((x, e_i) - (y, e_i))^2}{\lambda_i + \sigma^2}} \quad (2)$$

where $\lambda_i$ represents an eigenvalue corresponding to an eigenvector $e_i$, and $\sigma^2$ designates a bias.

The distance expressed by the aforesaid equation (2) coincides with the maharanobis distance when the bias $\sigma$ assumes zero.

As a patented feature extraction technique using the KL expansion, there has been known "Face Recognition System" disclosed in U.S. Pat. No. 5,164,992. In this patent, the two components as shown in FIG. 3 extracts a feature for the pattern identification. One of the components, designated at numeral 201, serves as a face image acquisition input section 201, while the other, denoted at numeral 202, acts as a KL expansion execution section 202. The face image acquisition input section 201 obtains a face image as an assembly of density values at every pixel (n-dimensional feature vector, where n depicts the total number of pixels of the image) and conveys it to the KL expansion execution section 202. The KL expansion execution section 202 calculates a orthonormal base (basis) through the KL expansion on the basis of N face images coming from the face image acquisition input section 201 and subsequently selects M ($\leq$n, N) bases in the order of decreasing eigenvalue out of the calculation results to retain the eigenvalues and the coordinates of the vectors corresponding thereto.

However, although the KL expansion is an optimal orthogonal development in view of reducing the minimum mean squared error or enhancing the scattering property of data, it is a problem in the case of using for the purpose of extracting a feature for the pattern identification. More specifically, the most important point for the patter identification is how to accurately identify the confusing feature vectors close in distance to each other, and for this purpose, it is preferable to promote only the scattering property between data close in distance to each other without enhancing the mutual scattering properties of all data. For this reason, with a prior system which carries out the feature extraction directly using the KL expansion, a problem exists in that difficulty is experienced in the identification of the confusing data.

On the other hand, for a face image recognition system, image data (for example, a variable-density image with M pixels in the vertical directions and N pixels in the horizontal directions) is completely expressible with the M·N-dimensional vectors in such a manner that each pixel is treated as one independent coordinate axis and the coordinate value is expressed as the density value of the pixel (for example, 10000 dimensions when 100×100). Accordingly, if L (L>10000) input images are linearly independent to each other, a 10000-dimensional space becomes necessary in order to express this L-image information. However, in terms of human faces, through the recent studies, there has been known the fact that almost faces were expressible with an extremely small dimensional space. This is because as compared with general images the human faces considerably resemble each other (they have eyes, a nose, mouth and others in common and these components have a similar positional relation to each other). A detailed discussion about these matters has been made, for example, in the document "Application of the Karhunen-Loeve procedure for the characterization of human faces" (IEEE Trans. on Pattern Analysis and Machine Intelligence. vol 12, no. 1 1990), written by M. Lirby and L. Sirovich.

The KL expansion system, well-known as a recognition method of face images, takes notice of this nature of the general face images to extract a feature from the face image through the KL expansion for recognition. A detailed description is taken in the document "Face Recognition Using Eigenfaces" CVPR '91 (PROc. IEEE Conf. on Computer Vision and Pattern Recognition 1991), written by Matthew A. Turk and Alex P. Pentland. Although slightly different in input and output, the face image recognition can commonly be defined as a method which previously registers face image being models in a data base to recognize the face image of a person on the model data most similar to an input image. From this point of view, the KL expansion method is designed to approximate the an input face image I and a model image M through the linear combination of P eigenvectors Ei (i =1 . . . P) as shown by the following equation (3) taking the above description into consideration to perform the collation between the approximate data.

$$\hat{M} = \sum_{i=1}^{r} \langle M, E_i \rangle E_i \quad (3)$$

where $\hat{M}$ represents an approximate value to a model face M and $(M, E_i)$ designates an inner product of vectors M and $E_i$.

The KL method uses, as the basic vectors, the eigenvectors corresponding to P (for example, approximately 100) eigenvalues selected out of the eigenvalues of a covariance matrix obtainable from W teaching face image data in the order of decreasing magnitude. The use of this expression can reduce the expressive space of an image from the M·N (=10000) dimensions up to the approximately P (=100) dimensions while minimizing the loss of the image information contents, and hence it has hitherto been known as an effective technique for the image compression or the like, and is referred to as the KL expansion. According to this KL expansion, as a result of the extraction of a feature other than the nature on the information compression, the teaching data projected are separable most nicely, that is, distinguishable, in a space (which is referred to as an eigenface space) formed by the eigenvectors. In fact, according to the aforesaid document written by Matthew A. Turk and Alex P. Pentland, the person set of the teaching data coincides with the person set of the registered data, and a considerably excellent recognition result is attainable from the experiment in which the face of a person used for the teaching data is newly photographed to be used as an input image.

FIG. 4 is an illustration of an arrangement of a prior face image recognition system disclosed in the aforesaid document written by Matthew A. Turk and Alex P. Pentland, and referring to FIG. 4 a description will be made hereinbelow of an operation of this face image recognition system. In FIG. 4, a KL expansion unit 21 also serves as a first feature extraction means and a second feature extraction means, and implements the feature extraction from each model image existing in a model image memory 22 and stores a feature vector in a model feature vector memory 23, with these being done in the off-line processing. In the on-line, an input image, taken through a camera and retained in an object image memory 24, is transferred to the KL expansion unit 21 so that a feature vector is extracted as in the case of the model face image. Secondly, a model selection unit 25 finds out a model having a feature vector most similar to the feature vector of this input object face by checking with the contents of the model feature vector memory 23. More specifically, through the use of the basic vectors (as described before, the KL method uses, as the basic vectors, the eigenvectors corresponding to P eigenvalues (for example, approximately 100 in number) selected out of the eigenvalues of the covariance matrix obtainable from W teaching face image data in the order of decreasing magnitude) stored in an eigenspace memory (not shown), each model face vector and the input object face vector are projected onto an eigenspace (the extraction of a feature) to attain a coordinate in the eigenspace to evaluate the similarity, thus providing the output on the face image recognition. At the time, the following equation (4) is employed for the evaluation of the similarity to detect the vectors which minimizes the result of the equation (4).

$$\sum_{l} (m_l - i_l)^2 \quad (4)$$

where $m_l$ and $i_l$ represent the $l^{th}$ values of the feature vector and the object face feature vector.

There is a problem which arises with the prior method proposed in the aforesaid document written by Matthew A. Turk and Alex P. Pentland, however, in that the realizable system scale is small for the following reason. That is, when the KL expansion exhibits its advantages to the utmost limit in the manner of equalizing the person of the teaching data with the person of the model data, even if the number of teaching data increases, the number of effective eigenvectors obtainable undergoes restriction for the reason as mentioned above, and hence, as the number of model data (registered persons) increases, the distribution of the feature vectors in the eigenface space gets to be tight to cause the recognition ability to lower. Therefore, the number of persons registerable (or recognizable) is exposed to limitation, which makes it difficult to realize a large-scale system.

SUMMARY OF THE INVENTION

The present invention has been developed in order to eliminate this problem, and it is therefore an object of the present invention to provide a feature extraction system which is capable of performing the identification of confusing data with a higher robustness than that of the prior art.

Another object of this invention is to provide a face image recognition system which is capable of realizing a large-scale system.

For the first-mentioned purpose, a feature extraction system according to the present invention comprises neighborhood vector selection means for selecting a neighborhood vector to a feature vector and feature vector space production means for discovering a subspace where a local scattering property becomes at a maximum at the orthogonal projection of the feature vector thereto. Thus, the feature extraction system according to this invention allows finding out a subspace which enhances only the scattering property between data close in distance to each other, and hence the identification of the confusing data becomes possible with a higher robustness than that of the prior art in a manner of conducting the identification after the projection of the feature vector to the subspace.

According to one aspect of the present invention, a feature extraction system, statistically analyzing a set of samples of feature vectors to calculate an amount indicative of a feature which will play an important role when pattern-identification is performed, comprises storage means for storing a feature vector inputted through a input means and neighborhood vector selection means for selecting a neighborhood vector, being a feature vector close to the feature vector inputted and stored in the storage means, from feature vectors existing in the storage means. Also included therein is feature vector space production means for outputting a partial vector space in which feature vectors locally most disperse when said feature vectors are orthogonally projected thereinto.

With this arrangement, unlike the prior art where the orthogonal expansion is made to enhance the scattering property of the feature vectors as a whole, according to this invention the orthogonal expansion is made to enhance the scattering property of the data close to each other to produce a subspace, thus allowing the identification of the confusing data with a higher robustness than that of the prior art.

Furthermore, when the feature vectors stored in the storage means are taken to be Vi ($1 \leq i \leq N$) and the dimension of these feature vectors is taken as n, the aforesaid neighbor vector selection means selects M ($\leq N$) feature vectors close to these feature vectors through the use of a distance $d(x, y)$ given from the above-mentioned equation (1), and the feature vector space production means obtains eigenvectors by solving an eigenvalue problem of a local covariance matrix given from an equation (8) which will be written later and selects m ($\leq N$, n) eigenvectors from among the obtained eigenvectors in the order of decreasing corresponding eigenvalue to output them as bases of a partial vector space which maximizes a local scattering property. Thus, the base of the vector space which maximizes the local scattering property can be expressed by the eigenvalue of the local covariance matrix given from the equation (8).

Still further, the neighborhood vector selection means selects the M feature vectors close to the respective feature vectors through the use of a correlation value determined according to an equation (5) which will be shown later.

Moreover, the neighborhood vector selection means first solves an eigenvalue problem of a covariance matrix obtained according to an equation (6) which will be described later and selects one eigenvector ei ($1 \leq i \leq 1$) corresponding to a large eigenvalue, and subsequently said neighborhood vector selection means calculates a distance according to the following equation which will be written later. In addition, the neighborhood vector selection means solves an eigenvalue problem of a covariance matrix obtained according to the equation (6) and selects one eigenvector ei ($1 \leq i \leq 1$) corresponding to a large eigenvalue, and subsequently said neighborhood vector selection means calculates a distance according to the equation (2). Further, the feature vector space production means outputs, in addition to said m eigenvectors, eigenvalues corresponding to the m eigenvectors. Accordingly, as the distance for the identification, the distance determined by the equation (2) can be calculated on the basis of these eigenvalues. Moreover, the feature vector space production means outputs, in addition to said m eigenvectors, dispersion values determined according to an equation (9), which will be written later, corresponding to these eigenvectors.

In addition, in accordance with the present invention, a face image recognition system has an arrangement to gradually narrow down a set of model faces to be collated with an input face. That is, even if the scale of a data base increases, when the set of model faces to be collated at every stage are restrictable without failing to give a correct answer, the problem resembles that in the case of a small-scale data base, and hence the large-scale system hardly has a great influence on the recognition rate.

For achieving this arrangement, a face image recognition system according to this invention includes first and second model limitation means for deriving a set of models each having a feature vector satisfying a given condition on the variation of the extracted feature vector from each model face image, model eigenspace holding means for calculating the maximum to Nth eigenvalues of the eigenvalues of a scattering property evaluation matrix defined by an equation (11), which will be shown later, in terms of a set of models chosen by the first model limitation means with respect to each model face image and eigenvectors corresponding thereto and for holding or retaining the calculation results at every model, first model selection means for selecting a model face vector M from among the model face vectors restricted by the second model limitation means as the candidate at a first stage, and second model selection means selects a model face vector, of the model face vectors restricted by the second model limitation means, showing the fact that the variation of a point m obtained in the manner of being projected onto a space made by N eigenvectors Ej (j=1 . . . N) held in the model eigenspace holding means according to an equation (12), which will be described later, with respect to a point i of an object face vector I projected onto the same eigenspace in the same procedure stands at a minimum.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
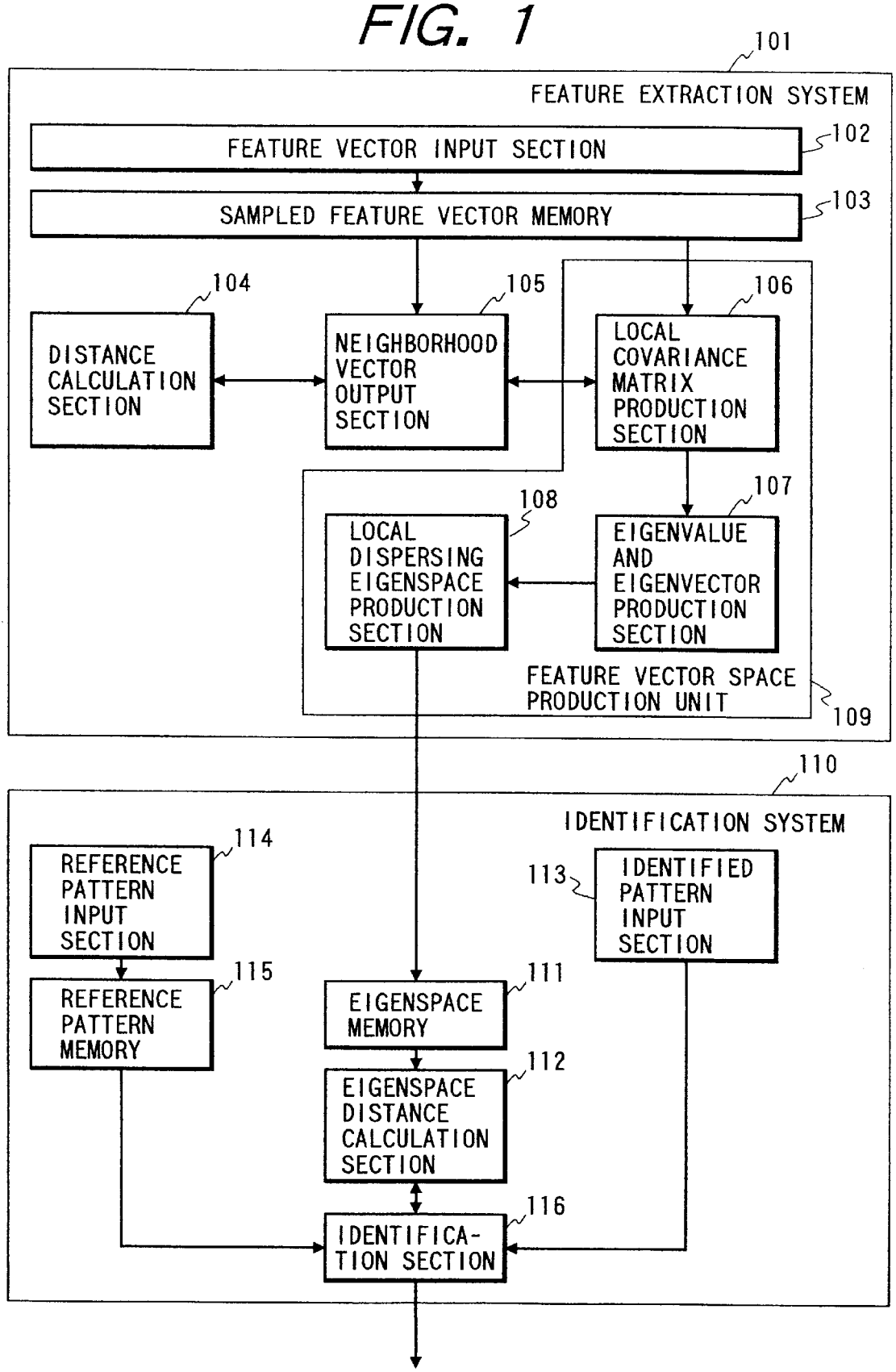
FIG. 1 is a block diagram showing a pattern identification system including a feature extraction system according to a first embodiment of the present invention.

A description will be made hereinbelow of a first embodiment of the present invention with reference to FIG. 1. Shown in FIG. 1 are a feature extraction system 101 according to this embodiment and a pattern identification system 110 which identifies a feature pattern on the basis of the output result of the feature extraction system 101. The feature extraction system 101 according to this embodiment includes a feature vector input section 102 for inputting a feature vector, a sampled feature vector memory 103 for storing as a set of samples the feature vectors inputted from the feature vector input section 102, and a distance calculation section 104 for outputting information on a distance between two designated feature vectors. Also included in the system 101 are a neighborhood vector output section 105 for making an request for the designated feature vectors and the distances of the feature vectors stored in the sampled feature vector memory 103 to the distance calculating section 104 to output all neighborhood vectors being feature vectors of the designated feature vectors standing within a range of the distance designated in advance, and a local covariance matrix production section 106 for making a request for the neighborhood vectors existing in relation to all the feature vectors stored in the sampled feature vector memory 103 to the neighborhood vector output section 105 to produce a local covariance matrix. Still further, included therein are an eigenvalue and eigenvector production section 107 for resolving an eigenvalue problem of the matrix produced in the local covariance matrix production section 106 to output an eigenvector and an eigenvalue thereof, and a local dispersing eigenspace production section 108 for outputting the eigenvectors, whose number is designated in advance, of the eigenvectors produced in the eigenvalue and eigenvector production section 107 in the order of decreasing corresponding eigenvalue. The local covariance matrix production section 106, the eigenvalue and eigenvector production section 107 and the local dispersing eigenspace production section 108 compose a feature vector space production section 109.

Furthermore, the pattern identification system 110 comprises an eigenspace memory 111 for storing the eigenvector outputted from the local dispersing eigenspace production section 108 of the feature extraction system according to this embodiment, an eigenspace distance calculation section 112 for calculating the distance between two inputted feature patterns after these patterns are projected to a vector space made the eigenvectors stored in the eigenspace memory 111, an identified pattern input section 113 for inputting an identified pattern, a reference pattern input section 114 for inputting a reference or criterion pattern, a reference pattern memory 115 for storing the reference pattern inputted, and an identification section 116 for asking the eigenspace distance calculation section 112 for the distances between the feature pattern inputted from the identified pattern input section 113 and all the feature patterns stored in the reference pattern memory 115 to select the closest feature pattern thereto in the reference pattern memory 115.

The distance calculation section 104 of the feature extraction system 101 according to this embodiment calculates the distance between the two feature vectors inputted according to the above-mentioned equation (1). In this instance, the distance calculation section 104 can also calculate the distance therebetween in accordance with the following equation (5) in place of the equation (1).

$$\operatorname{cor}(x, y) = \frac{\sum_i x_i y_i - \frac{\left(\sum_i x_i\right)\left(\sum_i y_i\right)}{n}}{\sqrt{\sum_j \left(x_j - \frac{\sum_i x_i}{n}\right)^2} \sqrt{\sum_j \left(y_j - \frac{\sum_i y_i}{n}\right)^2}} \quad (5)$$

where cor (x, y) represents a correlation value, and $x=(x_i)$, $y=(y_i)$.

In addition, the distance calculation section 104 can also solve an eigenvalue problem of a covariance matrix given from the following equation (6) on the basis of the feature vector Vi stored in the sampled feature vector memory 103 and select one eigenvector ei ($1 \leq i \leq 1$) with a large eigenvalue to calculate the distance according to the following equation (7).

$$\sum_{i=1}^{N} \sum_{j=1}^{N} (V_i - V_j)(V_i - V_j)^T \quad (T: \text{transposition}) \quad (6)$$

$$k1(x, y) = \sqrt{\sum_i ((x, e_i) - (y, e_i))^2} \quad (,): \text{inner product} \quad (7)$$

where x and y express feature vectors.

Furthermore, the distance calculation section 104 can also solve an eigenvalue problem of a covariance matrix given from the following equation (6) on the basis of the feature vector Vi stored in the sampled feature vector memory 103 and select one eigenvector ei ($1 \leq i \leq 1$) with a large eigenvalue to calculate the distance according to the above-mentioned equation (2).

The neighborhood vector output section 105 of the feature extraction system according to this embodiment, when the feature vector is inputted, asks the distance calculation section 104 for the distances between the inputted feature vector and the respective feature vectors stored in the sampled feature vector memory 103 to output all the vectors near the inputted feature vector. At this time, it is necessary that the distance expressing the degree of the neighborhood is designated to the neighborhood vector output section 105.

The local covariance matrix production section 106 of the feature extraction system 101 according to this embodiment makes a request for the neighborhood vector of the respective feature vectors Vi ($1 \leq i \leq N$) stored in the sampled feature vector memory 103 to the neighborhood vector output section 105 to produce a local covariance matrix determined by the following equation (8) where n(i) signifies the number of vectors outputted from the neighborhood vector output section 105 as the neighborhood vectors to the feature vector Vi.

$$\sum_{i=1}^{N} \sum_{j=1}^{n(i)} \left(V_i - V_j^{(i)}\right)\left(V_i - V_j^{(i)}\right)^T \quad (T: \text{transpositon}) \quad (8)$$

where $V_j^{(i)}$ denotes a neighborhood vector to Vi and n(i) depicts the total number of possible $V_j^{(i)}$ which varies at every i.

The eigenvalue and eigenvector production section 107 of the feature extraction system 101 according to this embodiment solves an eigenvalue problem of a local covariance matrix outputted from the local covariance matrix production section 106 to output an eigenvector and an eigenvalue corresponding thereto.

The local dispersing eigenspace production section 108 of the feature extraction system 101 according to this embodiment selects m eigenvectors out of the eigenvectors outputted from the eigenvalue and eigenvector production section 107 in the order to decreasing corresponding eigenvalue and outputs them. At this time, for value m it is necessary to select and designate one of integers $1 \leq m \leq N$, in advance. In addition to the eigenvectors, the local dispersing eigenspace production section 108 can also output an eigenvalue corresponding to each of the eigenvectors. Further, in addition to the eigenvectors, the local dispersing eigenspace production section 108 can also output a value (σ(ei): variance) indicative of the dispersion of the sampled feature vectors on the respective eigenvectors which is determined in accordance with the following equation (9).

$$\sigma(e_i) = \sqrt{\frac{\sum_k \left( (V_k, e_i) - \left( \frac{\sum_j (V_j, e_i)}{N} \right) \right)^2}{N}} \qquad (9)$$

The eigenspace distance calculation section 112 of the pattern identification system 110 uses the eigenvector ei (1≦i≦1) stored in the eigenspace memory 111 to calculate the distance the two feature vectors x and y according to the above-mentioned equation (7).

The identification section 116 of the pattern identification system 110 makes a request for the distances between the feature pattern inputted from the identified pattern input section 113 and all the feature patterns stored in the reference pattern memory 115 to the eigenspace distance calculation section 112 to select the closest feature pattern thereto in the reference pattern memory 115.

Furthermore, the eigenspace distance calculation section 112 of the pattern identification system 110 can also calculate the distance according to the above-mentioned equation (8) in cases where the local dispersing eigenspace production section 108 of the feature extraction system 101 according to this embodiment outputs the eigenvalue corresponding to each of the eigenvectors in addition to the eigenvectors. Still further, the eigenspace distance calculation section 112 of the pattern identification system 110 can also calculate the distance according to the following equation (10) in cases where the local dispersing eigenspace production section 108 of the feature extraction system according to this embodiment outputs, in addition to the eigenvectors, the value σ(ei) given from the above-mentioned equation (9) and representative of the dispersion of the sampled feature vectors on the respective eigenvectors ei.

$$\text{math2}(x, y) = \sqrt{\sum_i \frac{((x, e_i) - (y, e_i))^2}{\sigma(e_i)^2 + \sigma^2}} \qquad (10)$$

As obvious from the above description, the feature extraction system according to this embodiment has the ability to produce the vector space where the distances between the sampled feature vectors locally and most scatter. Unlike the prior art in which the identification is made by the projection to the space where the mutual distances between all the sampled vectors most disperse, according to this embodiment, the identification is made after the projection of the feature vector to the vector space produced in this embodiment, which can more accurately carry out the identification of the confusing data. Accordingly, this embodiment can provide a pattern identification system with an extremely high accuracy.

In addition, a description will be taken hereinbelow of a face image recognition system according to a second embodiment of the present invention.

The face image recognition system comprises a model face image input means for accepting a model face image (or a model face vector), a first feature extraction means for extracting a feature from a model face image, a first model feature vector holding means for holding the result of the feature extraction obtained when the first feature extraction means extracts the feature from the face image inputted through the model face image input means, and first and second model limitation means for making a limitation of a model. The first and second model limitation means take out a set of models having feature vectors satisfying a given condition of the variation from a feature vector with respect to each of the model face images. Also included in the recognition system is a model eigenspace holding means for calculating the greatest to Nth eigenvalues of the eigenvalues of a scattering property evaluation matrix defined by an equation (11), which will be shown later, in relation to the set of model faces limited by the first model limitation means and eigenvectors corresponding to the greatest to Nth eigenvalues and further for holding these calculation results at every model.

Furthermore, the same recognition system includes an object face image input means for inputting an object face image (or an object face vector) under recognition, a second feature extraction means for extracting a feature from a face image, a first object image feature vector holding means for holding a feature vector extracted by the second feature extraction means from the object face image inputted through the object face image input means, and a second model feature vector holding means for holding a feature vector extracted by the second feature extraction means from each of the model face images inputted through the model face image input means.

Still further, the same recognition system includes first and second model selection means. The first model selection means finds out a model feature vector of the model feature vectors held in the second model feature vector holding means, the model feature vector to be found showing a minimum variation with respect to the object image feature vector held in the first object image feature vector holding means. On the other hand, the second model selection means selects a model face vector from among the model face vectors M selected by the first model selection means and limited by the second model limitation means, with the model face vector to be selected being a vector showing a minimum variation between a point m obtainable in a manner of being projected onto a space defined by N eigenvectors Ej (j=1 . . . N) held in the model eigenspace holding means according to an equation (12) which will be written later and a point i of the object face vector I projected to the same space according to the equation 12.

In operation, when the model face image (model face vector) to be recognized is inputted through the model face image input means into the data base, the first feature extraction means extracts the feature from the image and the first model feature vector holding means holds the extraction result (feature data) therefrom. Through the use of this feature extraction result, the first and second model limitation means take a different set of models meeting a given condition on the variation (difference) of the feature vector with respect to each of model faces. The first model limitation means plays an role of restricting the models to be used for the calculation of an eigenspace held at every model (which will be described later), while the second model restriction means takes a role of limiting a set of model face vectors to be collated with the inputted data (object face vector).

Furthermore, the eigenspace holding means calculates the greatest to Nth eigenvalues of the eigenvalues of the scattering property evaluation matrix defined by the following equation (11) and the eigenvectors corresponding thereto in terms of the set of models limited by the first model limitation means at every model and holds them at every model.

$$D = \sum_{i=1}^{N_M} \sum_{j=1}^{N_{Mi}} (M_i - M_i^j)(M_i - M_i^j)^T \quad (11)$$

where $M_i$ represents the $i^{th}$ model face vector, $M_i^j$ designates the $j^{th}$ model face vector belonging to the neighborhood of the model $M_i$, $N_M$ denotes the total number of model face images, $N_{Mi}$ depicts the number of the models belonging to the neighborhood of the model $M_i$, and T signifies the transposition of a matrix (vector).

The above operation is executed by the on-line processing. The eigenvalues and the eigenvectors held by the eigenspace holding means are used for the feature extraction from the inputted image in the on-line process for the face image recognition.

When the object image to be recognized is inputted through the object face image input means, the second feature extraction means extracts the feature therefrom and the first object image feature vector holding means holds the feature quantity. Similarly, the second feature extraction means carries out the feature extraction from the model face image inputted through the model face image input means, and the second model feature vector holding means holds the feature quantity (this operation relies upon the off-line processing).

Subsequently, a model Mp is chosen by the first model selection means. This model Mp has a feature vector held in the second model feature vector holding means and most similar to the feature vector extracted from the object image and held in the first object image feature vector holding means. Considering from the viewpoint of the feature extraction by the second feature extraction means, the model Mp is a model most similar to the inputted object image.

As described before, the second model limitation means selects a different set of models satisfying a given condition at every model. This is for the purpose of, when the first model selection means makes a decision that the input image resembles one model, restricting the matching range for the final face recognition to a set of models similar to that model face vector (satisfying a given condition). Of the set of models (M) selected as the candidates, the second model selection means chooses a model and treats it as the recognition result. The model to be chosen shows the fact that a point m attainable in such a manner that it is projected onto a space made by N eigenvectors Ej (j=1 ... N) held in the eigenspace holding means in relation to the model Mp according to the following equation (12) has the highest similarity with respect to a point i of the object image vector I projected onto the same space according to the same equation (12).

$$m=(m_1, m_2, \ldots, m_N)$$

$$i=(i_1, i_2, \ldots, i_N)$$

$$m_k=(E_k, M)$$

$$i_l=(E_l, I) \quad (12)$$

where $m_k$ and $i_l$ respectively denote the $k^{th}$ and $l^{th}$ coordinate values on the projection of a model face vector M and an object face vector I to the eigenspaces, and (a, b) depicts the inner product of the vectors a and b.

The reason that the eigenspace holding means holds the eigenspace at every model involves holding an eigenspace in the vicinity of a model which has the highest ability to distinguish models contained in the neighborhood (in the similarity of the extracted feature vector) of that model. This is in contrast to the KL expansion method employing a space which distinguish (separate) the whole teaching image in average.

In addition, the second model selection means selects a model face vector, of the model face vectors restricted by the second model limitation means, showing the fact that the variation of a point m obtained in the manner of being projected onto a space made by N eigenvectors Ej (j=1 ... N) held in the model eigenspace holding means according to the above-mentioned equation (12) with respect to a point i of an object face vector I projected onto the same eigenspace according to the same equation (12), which variation is calculated in accordance with the following equation (13), stands at a minimum.

$$\sum_{l=1}^{N} (m_l - i_l)^2 / \sigma_l^2 \quad (13)$$

where $\sigma_l^2$ signifies the dispersion or variance of a model face vector in the direction of a vector $E_l$.

Furthermore, according to this embodiment, the second model selection selects means selects a model face vector, of the model face vectors restricted by the second model limitation means, showing the fact that the variation of a point m obtained in the manner of being projected onto a space made by N eigenvectors Ej (j=1 ... N)) held in the model eigenspace holding means according to the above-mentioned equation (12) with respect to a point i of an object face vector I projected onto the same eigenspace according to the same equation (12), which variation is calculated in accordance with the following equation (14), stands at a minimum.

$$\sum_{l=1}^{N} (m_l - i_l)^2 \quad (14)$$

Furthermore, according to this embodiment, the second model selection means selects a model face vector, of the model face vectors restricted by the second model limitation means, showing the fact that the variation of a point m obtained in the manner of being projected onto a space made by N eigenvectors Ej (j=1 ... N)) held in the model eigenspace holding means according to the above-mentioned equation (12) with respect to a point i of an object face vector I projected onto the same eigenspace according to the same equation (12), which variation is calculated in accordance with the following equation (15), comes to a minimum.

$$\sum_{j=1}^{k} (m_{l_j} - i_{l_j})^2 \quad (15)$$

where $(m_{l_j}-i_{l_j})^2$ signifies the $j^{th}$ value of $(m_l-i_l)^2$ (l=1, ..., N) when counting from the minimum value.

Still further, according to this embodiment, the second model selection means selects a model face vector, of the model face vectors restricted by the second model limitation means, showing the fact that the variation of a point m obtained in the manner of being projected onto a space made by N eigenvectors Ej (j=1 ... N)) held in the model eigenspace holding means according to the above-mentioned equation (12) with respect to a point i of an object face vector I projected onto the same eigenspace according to the same equation (12), which variation is calculated in accordance with the following equation (16), stands at a minimum.

$$\sum_{j=1}^{k} (m_{l_j} - i_{l_j})^2 / \sigma_{l_j}^2 \qquad (16)$$

where $(m_{l_j}-i_{l_j})^2/\sigma_{l_j}^2$ stands for the $j^{th}$ of $(m_l-i_l)^2$ ($l=1, \ldots, N$) when counting from the minimum value, and $\sigma_l^2$ signifies the dispersion of a model face vector in the direction of a vector $E_l$.

Figure 2:
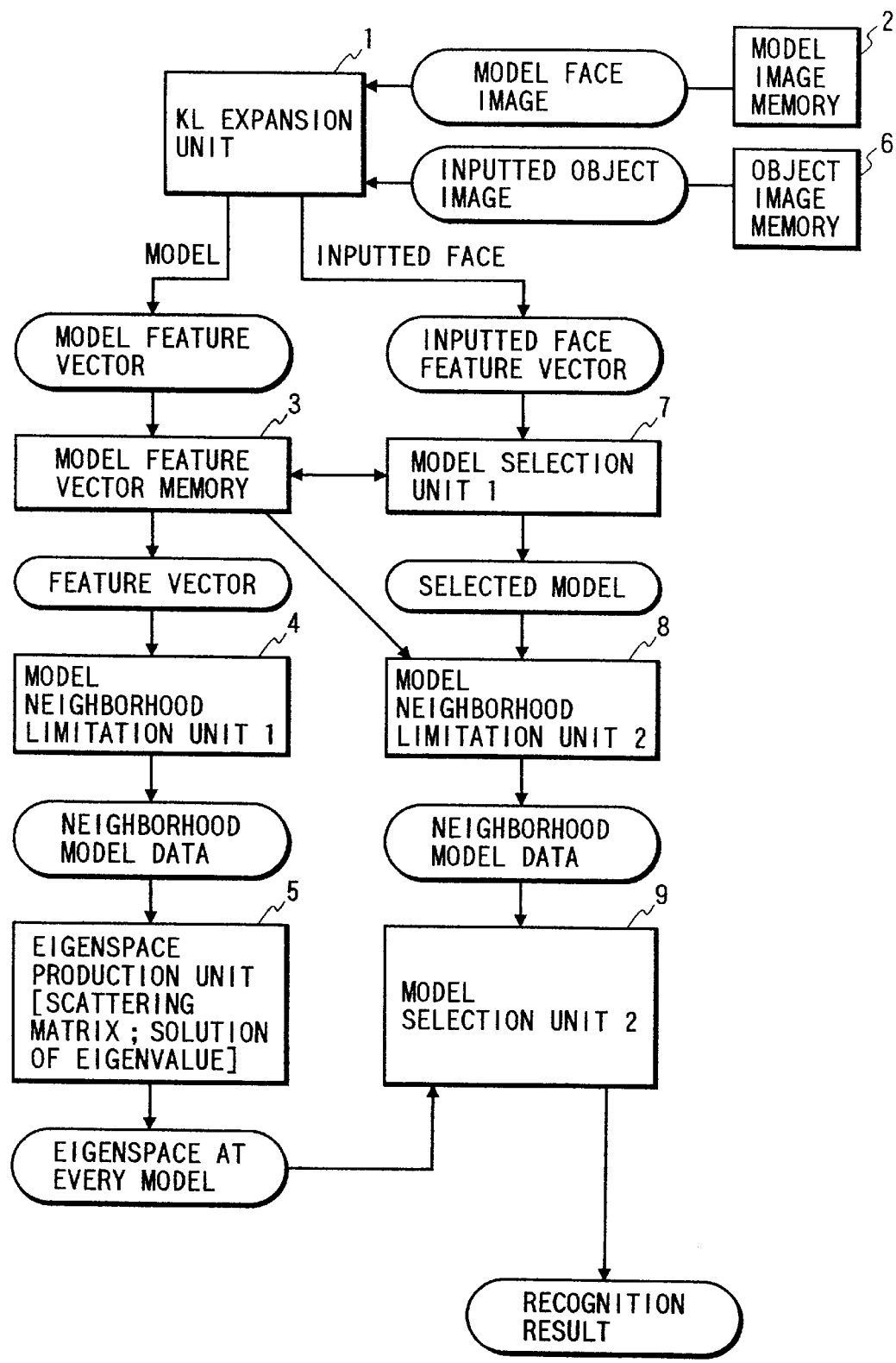
FIG. 2 is an illustration of an arrangement of a face image recognition system according to a second embodiment of the present invention.
Figure 3:
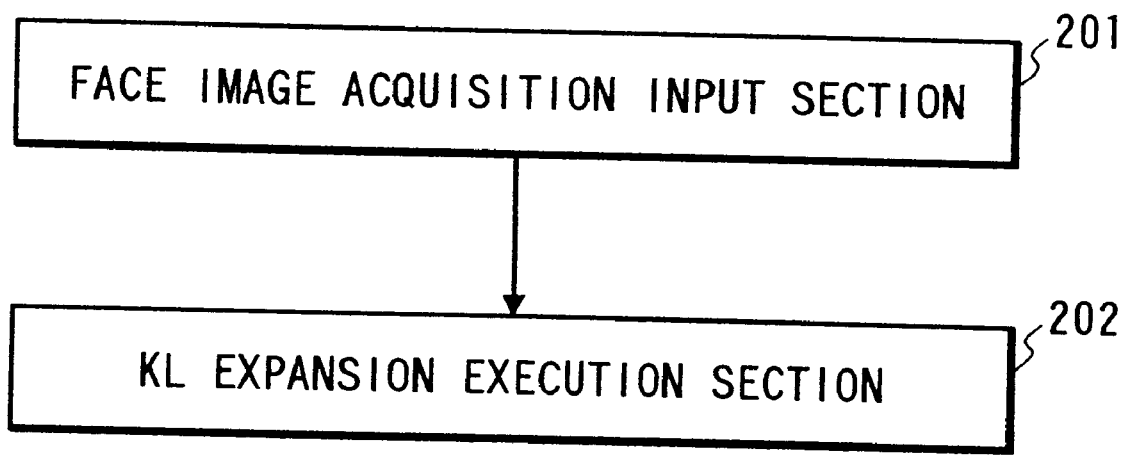
FIG. 3 is a block diagram showing an arrangement of a prior feature extraction system.
Figure 4:
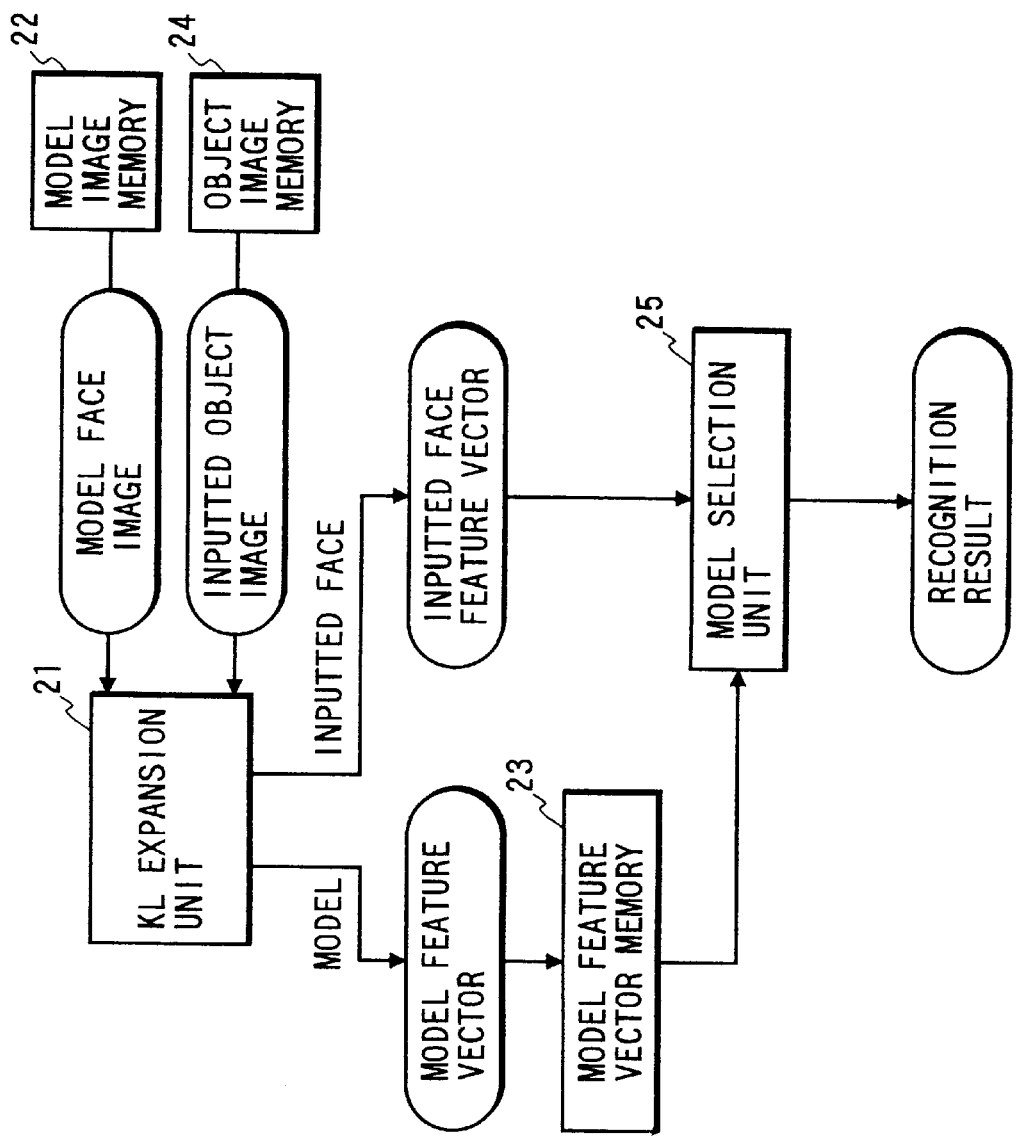
FIG. 4 is an illustration of an arrangement of a prior face image recognition system.

Moreover, the second embodiment of this invention will be described hereinbelow with reference to FIG. 2. In FIG. 2, a KL expansion unit 1 serves as both the first and second feature extraction means. All sets of model images are used as the teaching images for the KL expansion. First of all, through the use of the KL expansion method (see the aforesaid document written by Matthew A. Turk and Alex P. Pentland), the feature extraction is made from each of the model images stored in a model image memory 2, and the resultant feature vectors are put in a model feature vector memory 3. Then, a first model neighborhood limitation unit 4 narrows these models down to models belonging to the neighborhood according to an operation method based upon the following equation (17).

If $|M_i-M|<R \rightarrow$ Model Face $M_i$ is contained in Neighborhood.

Otherwise $\rightarrow$ Model face $M_i$ is not included in Neighborhood. (17)

where R designates a constant.

The set of neighborhood models restricted from the respective models are used in an eigenspace production unit 5 for the calculation of an eigenspace formed at every model in accordance with the following procedure.

First, a scattering property evaluation matrix is calculated in accordance with the above-mentioned equation (11) to obtain the greatest to Nth eigenvalues of the eigenvalues of this matrix and the eigenvectors corresponding to these eigenvalues. These information are stored in an eigenspace memory of the eigenspace production unit 5 at every model. These operations are made by the off-line processing. On the other hand, in the on-line processing, an input image taken through a camera and held in an object image memory 6 is transferred to the KL expansion unit 1 to extract a feature vector as well as the model image.

Secondly, a first model selection unit 7 finds out a model having a feature vector most similar to the feature vector of that object face by the collation with the contents of the model feature vector memory 3. At this time, for the evaluation of the similarity, the following equation (18), called Maharanobis distance, is used to detect the feature vector which minimizes this equation (18).

$$\sum_l \frac{|m_l - i_l|^2}{\sigma_l^2} \qquad (18)$$

where $m_l$ and $i_l$ represent the $l^{th}$ values of a model feature vector and an object face feature vector, and $\sigma_l^2$ designates the $l^{th}$ dispersion of the model feature vector.

The model selected here is taken as the model Mp, and the set of models limited and held in a second model neighborhood limitation unit 8 with respect to the model Mp are taken to be {MNp}. A second model selection unit 9 uses a basic vector stored in the eigenspace memory with respect to the model Mp to project the input object face vector I and the model face vectors M included in the model set {MNp} onto the eigenspace according to the above-mentioned equation (12) (feature extraction), thus obtaining the coordinates m and i in the eigenspace. Finally, a model M_opt having the coordinate of the coordinate set {m} of this model, which minimizes the above-mentioned equation (13) (evaluation equation), is found and outputted as the image recognition result.

According to this second embodiment, the candidates for the plausible models matching with the input image are picked up through the first-stage model selection (the first model selection means) and subsequently, through the use of a different feature extraction from the first stage, the final recognition is made by the second-stage selection from the model candidates. Accordingly, if the first stage narrow-down is appropriate, even if the number of models to be registered increases, because of the limitation of the candidates, the decrease in the recognition rate does not occur unlike the prior methods. In addition, if the first-stage process is divided into finer continuous stepwise candidate limitation processes, the above-mentioned effects can apply to extremely large model data. Further, since in terms of each of models an eigenspace which can optimally separate the face image included in the neighborhood thereof (similar thereto) is held to carry out the recognition using the distance in this eigenspace, an extremely correct recognition result is attainable. Thus, using the face image recognition system according to this embodiment, even for a large-scale system with a large number of registered model images, the face image recognition is realizable without the occurrence of the decrease in recognition rate.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A feature extraction system for statistically analyzing a set of samples of feature vectors to calculate an amount indicative of a feature which plays an important role when pattern-identification is performed, said system comprising:

feature vector input means for inputting a feature vector;

storage means for storing said feature vector inputted through said input means;

neighborhood vector selection means for selecting a neighborhood vector, being a feature vector close to said feature vector inputted and stored in said storage means, from feature vectors existing in said storage means; and feature vector space production means for outputting a partial vector space in which feature vectors locally most disperse when said feature vectors are orthogonally projected thereinto, wherein, when said feature vectors stored in said storage means are taken to be $V_i$ ($1 \leq i \leq N$) and the dimension of these feature vectors is taken as n, said neighbor vector selection means selects M ($\leq N$) feature vectors close to these feature vectors through the use of a distance d(x, y), where x and y represent feature vectors, determined according to the following equation (1):

$$d(x, y) = \sqrt{(x_i - y_i)^2}$$

and said feature vector space production means obtains eigenvectors by solving an eigenvalue problem of a local covariance matrix given from the following equation (2):

$$\sum_{i=1}^{N}\sum_{j=1}^{n(i)}(V_i - V_j^{(i)})(V_i - V_j^{(i)}) \quad (T: \text{transposition})$$

where $V_j^{(i)}$ denotes a neighborhood vector to $V_i$ and n(i) depicts the total number of possible $V_j^{(i)}$ which varies at every i, moreover, said feature vector space production means selects m ($\leq$ N, n) eigenvectors from the obtained eigenvectors in the order of decreasing corresponding eigenvalue to output them as bases of a partial vector space which maximizes a local scattering property.

2. A feature extraction system as defined in claim 1, wherein said neighborhood vector selection means selects said M feature vectors close to the respective feature vectors through the use of a correlation value cor(x, y), where x and y denote feature vectors, determined according to the following equation (3) in place of the above-mentioned equation (1)

$$\text{cor}(x, y) = \frac{\sum_i x_i y_i - \left(\frac{\sum_i x_i}{n}\right)\left(\frac{\sum_i y_i}{n}\right)}{\sqrt{\sum_j \left(x_j - \left(\frac{\sum_i x_i}{n}\right)\right)^2} \sqrt{\sum_j \left(y_j - \left(\frac{\sum_i y_i}{n}\right)\right)^2}}$$

where $x=(x_i)$ and $y=(y_i)$.

3. A feature extraction system as defined in claim 1, wherein, in place of calculating said distance according to the above-mentioned equation (1), said neighborhood vector selection means first solves an eigenvalue problem of a covariance matrix obtained according to the following equation (4):

$$\sum_{i=1}^{N}\sum_{j=1}^{N}(V_i - V_j)(V_i - V_j)^T \quad (T: \text{transposition})$$

and selects one eigenvector ei ($1 \leq i \leq 1$) corresponding to a large eigenvalue, and subsequently said neighborhood vector selection means calculates a distance k1(x, y), where x and y express feature vectors, according to the following equation (5):

$$k1(x, y) = \sqrt{\sum_i ((x, e_i) - (y, e_i))^2} \quad (,): \text{inner product}$$

4. A feature extraction system as defined in claim 1, wherein, in place of calculating said distance according to the above-mentioned formula (1), said neighborhood vector selection means solves an eigenvalue problem of a covariance matrix obtained according to the following equation (4):

$$\sum_{i=1}^{N}\sum_{j=1}^{N}(V_i - V_j)(V_i - V_j)^T \quad (T: \text{transposition})$$

and selects one eigenvector ei ($1 \leq i \leq 1$) corresponding to a large eigenvalue, and subsequently said neighborhood vector selection means calculates a distance math(x, y), where x and y express feature vectors, according to the following equation (6):

$$\text{math}(x, y) = \sqrt{\sum_i \frac{((x, e_i) - (y, e_i))^2}{\lambda_i + \sigma^2}}$$

where $\lambda_i$ represents an eigenvalue corresponding to an eigenvector $e_i$, and $\sigma^2$ designates a bias.

5. A feature extraction system as defined in claim 1, wherein said feature vector space production means outputs, in addition to said m eigenvectors, eigenvalues corresponding to said m eigenvectors.

6. A feature extraction system as defined in claim 1, wherein said feature vector space production means outputs, in addition to said m eigenvectors, dispersion values σ(ei) determined according to the following equation (7) corresponding to these eigenvectors ei:

$$\sigma(e_i) = \sqrt{\frac{\sum_k \left((V_k, e_i) - \left(\frac{\sum_j (V_j, e_i)}{N}\right)\right)^2}{N}}$$

7. A face image recognition system comprising:

model face image input means for receiving a model face image;

first feature extraction means for extracting a feature from said model face image;

first model feature vector holding means for holding a result of the feature extraction obtained when said first feature extraction means extracts said feature from said face image inputted through said model face image input means;

first and second model limitation means for taking a set of models having feature vectors satisfying a given condition on the variation from a feature vector of each of the model face images;

model eigenspace holding means for calculating the greatest to Nth eigenvalues of eigenvalues of a scattering property evaluation matrix defined by the following equation (8) in relation to said set of model faces limited by said first model limitation means and eigenvectors corresponding to the greatest to Nth eigenvalues and further for holding these calculation results at every model, $$D = \sum_{i=1}^{N_M}\sum_{j=1}^{N_{Mi}}(M_i - M_i^j)(M_i - M_i^j)^T \tag{8}$$

where $M_i$ represents the $i^{th}$ model face vector, $M_i^j$ designates the $j^{th}$ model face vector belonging to the neighborhood of said model $M_i$, $N_M$ denotes the total number of model face images, $N_{Mi}$ depicts the number of models belonging to the neighborhood of said model $M_i$, and T signifies the transposition of a matrix (vector);

object face image input means for receiving an object face image under recognition;

second feature extraction means for extracting a feature from said face image;

first object image feature vector holding means for holding a feature vector extracted by said second feature extraction means from said object face image inputted through said object face image input means;

second model feature vector holding means for holding a feature vector extracted by said first feature extraction means from each of the model face images inputted through said model face image input means;

first model selection means for finding a model feature vector of the model feature vectors held in said second model feature vector holding means, said model feature vector to be found showing a minimum variation with respect to the object image feature vector; and second model selection means for selecting a model face vector from among the model face vectors M selected by said first model selection means and limited by said second model limitation means, said model face vector to be selected being a vector by which variation of a point m obtainable in a manner of being projected onto a space defined by N eigenvectors Ej (j=1 . . . N) held in said model eigenspace holding means according to the following equation (9) with respect to a point i of the object face vector I projected to the same space according to the same equation (9) stands at a minimum, $$m=(m_1, m_2, \ldots, m_N)$$
$$i=(i_1, i_2, \ldots, i_N)$$
$$m_k=(E_k, M)$$
$$i_l=(E_l, I) \quad (9)$$

where $m_k$ and $i_l$ respectively denote the $k^{th}$ and $l^{th}$ coordinate values on the projection of said model face vector M and an object face vector I to an eigenspaces, and (a,b) depicts the inner product of vectors a and b.

8. A face image recognition system as defined in claim 7, wherein said second model selection means selects a model face vector, of the model face vectors restricted by said second model limitation means, said model face vector selected showing the fact that the variation of a point m obtained in the manner of being projected onto a space made by N eigenvectors Ej (j=1 . . . N) held in said model eigenspace holding means according to said equation (9) with respect to a point i of an object face vector I projected onto the same eigenspace according to the same equation (9), which variation is calculated in accordance with the following equation (10), stands at a minimum, $$\sum_{l=1}^{N}(m_l - i_l)^2 / \sigma_l^2 \quad (10)$$

where $\sigma_l^2$ signifies the dispersion of a model face vector in the direction of a vector $E_l$.

9. A face image recognition system as defined in claim 7, wherein said second model selection means selects a model face vector, of the model face vectors restricted by said second model limitation means, said model face vector selected showing the fact that the variation of a point m obtained in the manner of being projected onto a space made by N eigenvectors Ej (j=1 . . . N) held in said model eigenspace holding means according to said equation (9) with respect to a point i of an object face vector I projected onto the same eigenspace according to the same equation (9), which variation is calculated in accordance with the following equation (11), stands at a minimum, $$\sum_{l=1}^{N}(m_l - i_l)^2. \quad (11)$$

10. A face image recognition system as defined in claim 7, wherein said second model selection means selects a model face vector, of the model face vectors restricted by said second model limitation means, said model face vector selected showing the fact that the variation of a point m obtained in the manner of being projected onto a space made by N eigenvectors Ej (j=1 . . . N) held in said model eigenspace holding means according to said equation (9) with respect to a point i of an object face vector I projected onto the same eigenspace according to the same equation (9), which variation is calculated in accordance with the following equation (12), comes to a minimum, $$\sum_{j=1}^{k}(m_{l_j} - i_{l_j})^2 \quad (12)$$

where $(m_{l_j}-i_{l_j})^2$ signifies the $j^{th}$ value of $(m_l-i_l)^2$ (l=1, . . . , N) when counting from the minimum value.

11. A face image recognition system as defined in claim 7, wherein said second model selection means selects a model face vector, of the model face vectors restricted by said second model limitation means, said model face vector selected showing the fact that the variation of a point m obtained in the manner of being projected onto a space made by N eigenvectors Ej (j=1 . . . N) held in said model eigenspace holding means according to said equation (9) with respect to a point i of an object face vector I projected onto the same eigenspace according to the same equation (9), which variation is calculated in accordance with the following equation (13), comes to a minimum, $$\sum_{j=1}^{k}(m_{l_j} - i_{l_j})^2 / \sigma_{l_j}^2 \quad (13)$$

where $(m_{l_j}-i_{l_j})^2/\sigma_{l_j}^2$ signifies the $j^{th}$ value of $(m_l-i_l)^2$ (l=1, . . . , N) when counting from the minimum value, and $\sigma_l^2$ signifies the dispersion of a model face vector in the direction of a vector.

* * * * *